United States Patent [19]

Watanabe et al.

[11] 4,250,416
[45] Feb. 10, 1981

[54] MOVING-COIL TYPE MOTOR

[75] Inventors: Junichi Watanabe, Kawaski; Hiroshi Koide, Sagamihara; Shigemoto Temmyo, Tokyo, all of Japan

[73] Assignee: Ricoh Company, Ltd., Tokyo, Japan

[21] Appl. No.: 954,763

[22] Filed: Oct. 26, 1978

[30] Foreign Application Priority Data

Nov. 24, 1977 [JP] Japan ................. 52-140980

[51] Int. Cl.³ ........................... H02K 41/07
[52] U.S. Cl. ..................... 310/13; 310/27; 310/36
[58] Field of Search ............ 310/27, 36, 13, 12, 310/38, 59

[56] References Cited

U.S. PATENT DOCUMENTS

| | | | |
|---|---|---|---|
| 3,440,464 | 4/1969 | Tolmie | 310/27 X |
| 3,659,124 | 4/1972 | Lathrop | 310/27 X |
| 3,743,870 | 7/1973 | Hunt | 310/13 |
| 3,751,693 | 8/1973 | Gabor | 310/13 |
| 3,813,566 | 5/1974 | Edwards et al. | 310/27 X |
| 3,816,777 | 6/1974 | Metzgar et al. | 310/27 X |
| 4,079,400 | 3/1978 | Kondo | 310/13 X |

*Primary Examiner*—Donovan F. Duggan
*Attorney, Agent, or Firm*—Blanchard, Flynn, Thiel, Boutell & Tanis

[57] ABSTRACT

A moving-coil type motor according to the present invention is composed of a hollow moving coil to which electrical energy is to be applied, a magnetic circuit member made of a material having high permeability which consists of an inner portion disposed within the hollow part of said moving coil and an outer portion disposed outside the same coil, said inner and outer portions being interconnected at their rear ends, and a magnet installed on said magnetic circuit member. The foregoing moving coil is fixed to an arm member supported to be capable of oscillating around a shaft, is curved into a circular arc centering around said shaft, and has a square-shaped cross section. The magnetic circuit member is also curved into a circular arc centering around the foregoing shaft similar to the moving coil, and the shape of the cross section of both the inner portion and the outer portion thereof is square similar to the shape of cross section of the moving coil.

8 Claims, 3 Drawing Figures

MOVING-COIL TYPE MOTOR

BACKGROUND OF THE INVENTION

The present invention relates to a moving-coil type motor which is applicable to a wide range of use as a driving apparatus for effecting oscillation.

As the driving apparatus for effecting oscillation of an object, for instance, a driving apparatus for the oscillating mirror of a copying machine, a servo-motor has hitherto been generally utilized, that is, it has been a conventional way to connect this servo-motor to the oscillating mirror through some transmission means, e.g., gear, belt, cam, etc. and drive the servo-motor, thereby effecting oscillation of the oscillating mirror. However, a driving apparatus for effecting oscillation as above is defective in that, as it cannot dispense with said transmission means, the construction of it as a whole is complicated and, moreover, it requires intricate maintenance and control in order to secure accuracy and high precision of power transmission through said transmission means.

Hence, the present inventors have designed a moving-coil type motor which consists of a hollow moving coil to which electrical energy is to be applied, a magnetic circuit member made of a material having high permeability which consists of an inner portion disposed within the hollow part of said moving coil and an outer portion disposed outside the same coil, said inner and outer portions being interconnected at their rear ends, and a magnet installed on said magnetic circuit member, in which said moving coil is fixed to an arm member supported to be capable of oscillating around a shaft and is curved into a circular arc centering around said shaft, and said magnetic circuit member is also curved into a circular arc centering around the shaft similar to the moving coil. When a motor devised as above is employed for the aforesaid oscillating mirror of a copying machine, it can directly drive the oscillating mirror to effect an oscillatory movement thereof, and accordingly it is obvious that the aforesaid transmission means, e.g., gear, belt, cam, etc., become utterly unnecessary.

By the way, in order to construct the foregoing moving-coil type motor actually, the question of what shape of cross section should be chosen therefor must be settled first.

What is first conceivable is to form the cross section of the motor as a whole into a round shape. In this case, the shape of the cross section of the inner portion of the magnetic circuit member disposed in the center of the motor is to be round or annular, the shape of the cross section of the moving coil surrounding said inner portion and that of the outer portion of the magnetic circuit member surrounding the moving coil are to be annular, and the shape of the cross section of the magnet is of course to be annular. However, since it is considerably difficult to construct the respective constituent members of the motor to have such cross-sectional shapes, not only a high manufacturing technique is required therefor, but also the cost of production thereof inevitably becomes high. Especially, as regards a permanent magnet as above which has annular cross section and has axial line curved into a circular arc at that, it is practically difficult to construct it as one body by employing magnets useful in motors in general such as ferrite magnet, rare earth cobalt magnet, cast magnet, etc. or perform working thereon. For the purpose of alleviating the difficulty in constructing a permanent magnet having such shapes as above and/or working thereon, it is conceivable to take various measures such as follows: (i) application of a permanent magnet composed of a plurality of permanent magnet members as divided along the circumferential direction thereof; (ii) application of a permanent megnet composed of rubber magnet; etc. Taking of such measures is admittedly for alleviation of the difficulty in manufacturing a permanent magnet or working thereon, but on the other hand, it newly gives rise to various inconveniences such that (i') the work of disposing and fixing said plurality of permanent magnet members on the magnetic circuit member according to predetermined arrangement of positions is difficult, and (ii') in the case where said rubber magnet is employed, not only the work of fixing thereof is as difficult as the foregoing work, but also the rubber magnet per se is apt to break or crack, or as the thickness and/or the curvature of the rubber magnet depend on the adhesion strength of the adhesive employed for the work of fixing the rubber magnet, the size of the motor as a whole is also influenced thereby.

What is also conceivable is to construct a moving-coil type motor by forming the inner portion of the magnetic circuit member in the shape of a flat board having its two side edges curved into circular arc and forming the outer portion of the magnetic circuit member in the shape of a couple of parallel flat boards which are respectively connected to the rear end of the foregoing flat board and have their two side edges curved into circular arc. A motor of such a configuration has an advantage that it is easy to manufacture or perform working thereon, compared with the foregoing motor having a round cross section. On the other hand, however, it has such disadvantages that, because of the construction in which the outer portion of the magnetic circuit member does not surround the moving coil and the permanent magnet is not disposed along the whole circumference of the moving coil but is substantially fixed to the outer portion, which is in the shape of two flat boards, of the magnetic circuit member, the efficiency of the magnetic circuit member is inferior to that of the foregoing motor devised to enclose the inner constituent members with the outer constituent members, and accordingly the efficiency of the motor is inferior. Therefore, if a desired efficiency is to be obtained, the size of the motor as a whole will inevitably come to be large.

SUMMARY OF THE INVENTION

One object of the present invention is to provide a moving-coil type motor which eliminates the aforesaid drawbacks of the conventional driving apparatuses for effecting oscillation.

Another object of the present invention is to provide a moving-coil type motor which is composed of a hollow moving coil to which electrical energy is to be applied, a magnetic circuit member made of a material having high permeability which consists of an inner portion disposed within the hollow part of said moving coil and an outer portion disposed outside the same coil, said inner and outer portions being interconnected at their rear ends, and a magnet installed on said magnetic circuit member, in which said moving coil is fixed to an arm member supported to be capable of oscillating around a shaft, is curved into a circular arc centering around said shaft and has a square-shaped cross section, and said magnetic circuit member is also curved into a circular arc centering around the shaft similar to the moving coil, while the cross section of said inner and outer portions constituting the magnetic circuit member is of square shape similar to that of the moving coil, whereby it is rendered possible to perform the manufacture of the respective constituent members and the working thereon easily and economically, resulting in easy and economical production of the motor as a whole.

A further object of the present invention is to provide a moving-coil type motor, in which any one of the side walls which composed the outer portion constituting the magnetic circuit member and having square-shaped cross section is devised to be detachable, whereby the adjustment of such parts as the space between the moving coil and the magnetic circuit member, the space between the moving coil and the magnet, etc. can be performed with ease while looking at the inside of the magnetic circuit member upon removing said side wall, the characteristics of the motor can be always maintained in proper conditions, and the manufacture of the magnetic circuit member as well as the working thereon and the installation of the magnet are much more facilitated.

DETAILED DESCRIPTION OF THE INVENTION

Figure 1:
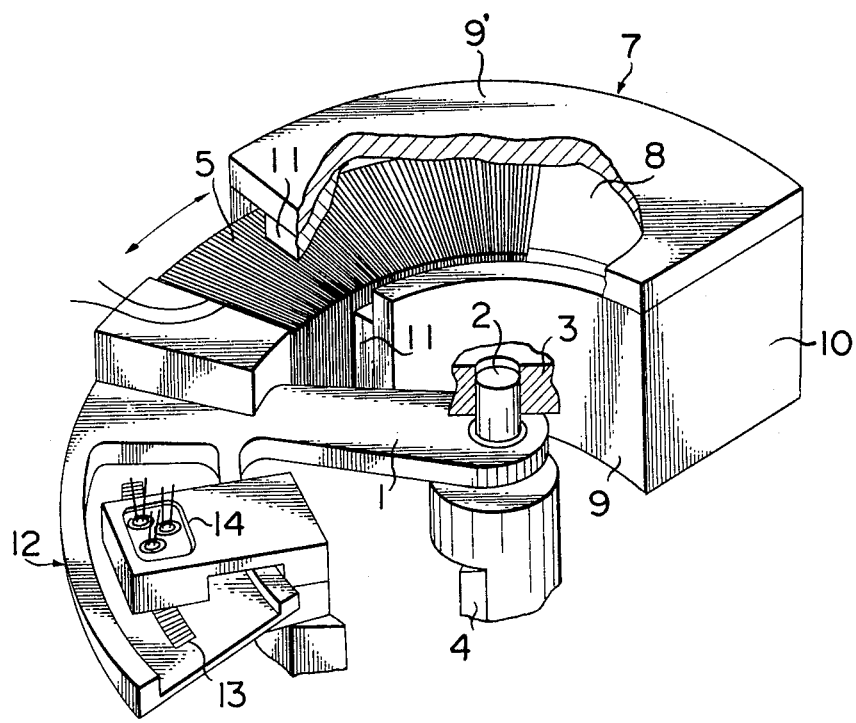
FIG. 1 is a partially cutaway perspective view illustrating an embodiment of the moving-coil type motor according to the present invention.
Figure 2:
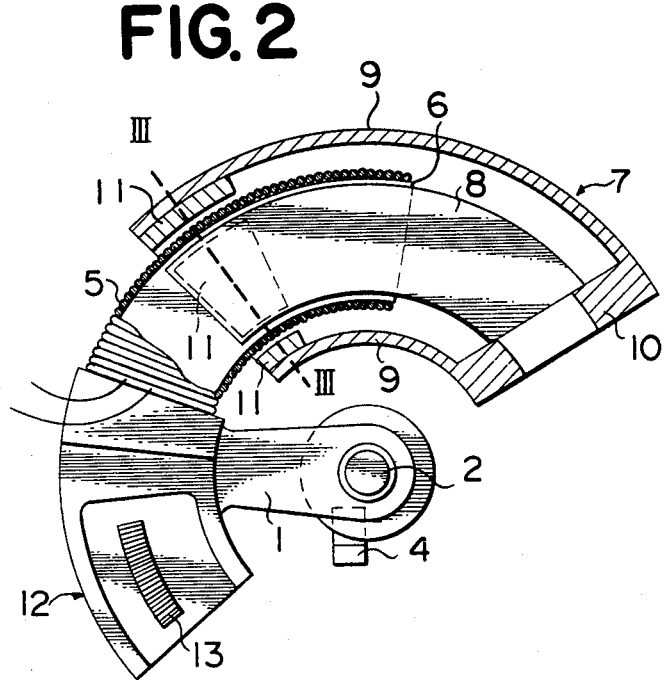
FIG. 2 is a transverse plane figure illustrating the essential parts of the same embodiment as in FIG. 1.
Figure 3:
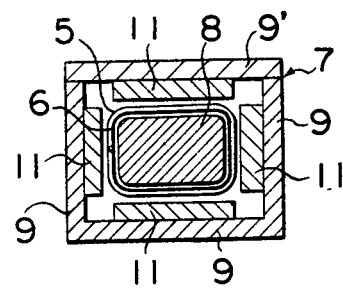
FIG. 3 is a vertical sectional view taken along the line III—III in FIG. 2.

Referring to the drawings, the reference numeral 1 denotes an arm whose base is fixed to a shaft 2, and said shaft 2 is rotatably supported on a bearing 3. On the shaft 2, there is supposed to be fixed the base 4 of an object-to-be-oscillated, for instance, the oscillating mirror of a copying machine, or the like. 5 denotes a moving coil, which is helically wound round a hollow support member 6 having rectangular cross section. This support member 6 is formed to curve into a circular arc centering around the shaft 2, and its base is fixed to the fore end portion of the arm 1. 7 denotes a magnetic circuit member made of a material having high permeability, which is formed to curve into a circular arc centering around the shaft 2 like the foregoing moving coil 5. This magnetic circuit member 7 is composed of an inner portion 8 which has a rectangular cross section similar to but smaller than that of the support member 6 and an outer portion 9 which has a rectangular cross section similar to but larger than that of the support member 6, and the rear ends of these portions 8 and 9 are interconnected through an end plate 10. Therefore, the manufacture of the magnetic circuit member 7 as well as the working thereon can be easily performed through, for instance, cold forging, casting, etc. at a low cost.

11 Denotes 4 pieces of permanent magnet, each of which is of plate-shape. Therefore, the manufacture of each permanent magnet 11 can be performed with ease and at a low cost by employing magnets useful for motors in general, for instance, ferrite magnet, rare earth cobalt magnet, cast magnet, or the like. These 4 pieces of permanent magnet 11 are to be installed one by one on the inside of 4 walls of the outer portion 9 in the vicinity of the fore end part of the magnetic circuit member 7 by, for instance, sticking with the aid of an appropriate adhesive. Accordingly, in the outer portion 9, any of four walls thereof can well form a magnetic circuit. Also, the ratio of the height to the breadth of the outer portion 9 of the magnetic circuit member 7 can be appropriately chosen at need without impairing the magnetic circuit forming efficiency. On this occasion, it goes without saying that the size of the permanent magnet 11, the ratio of the height of the support member 6 of the moving coil 5 to the breadth thereof, and the ratio of the height of the inner portion 8 of the magnetic circuit member 7 to the breadth thereof are to be chosen in conforming with the ratio of the height of the outer portion 9 to the breadth thereof.

Further, the magnetic circuit member 7 is so constructed that the top wall 9' of the outer portion 9 is detachable. Accordingly, the adjustment of such parts as the space between the moving coil 5 and the inner portion 8, the space between the moving coil 5 and the permanent magnet 11 as well as the outer portion 9, etc. can be easily performed while looking at the inside upon removing the top wall 9'. Besides, the manufacture of the magnetic circuit member 7' or the working thereon can be performed more easily and more inexpensively. Moreover, the fixing of the permanent magnets 11 can be very easily performed.

12 denotes a sensor unit, which is composed of a moving part 13 installed on the fore end part of the arm 1 and a detecting part 14 disposed contiguous to said moving part 13. The moving part 13 is formed to curve into a circular arc with the same curvature as that of the moving coil 5 centering around the shaft 2, and is supposed to move with the movement of the moving coil 5 on an equality. The detecting part 14 is supposed to detect the extent of the movement performed by the moving part 13. The sensor unit 12 may be of any type, but it is preferably of electrical type.

The mode of the working of a motor devised as above is as follows. When an electric current is applied to the moving coil 5 in a certain direction, the moving coil 5 moves in a state of being forced out of the magnetic circuit member 7, the arm 1 oscillates with this movement, and the base 4 works to oscillate an object-to-be-oscillated as illustrated. And, when an electric current of the opposite direction is applied to the moving coil 5, the moving coil 5 moves in a state of being pulled into the magnetic circuit member 7, the arm 1 oscillates in the opposite direction, and the base 4 works to oscillate said object-to-be-oscillated in the opposite direction.

Although a particular preferred embodiment of the invention has been disclosed in detail for illustrative purpose, it will be recognized that variations or modifications of the above disclosed apparatus, including the arrangement of parts, lie within the scope of the present invention.

What is claimed is:

1. In a moving-coil type motor for limited angular movement of an object, said motor including:
   a hollow moving coil to which electrical energy is to be applied;
   a magnetic circuit member made of a material having high permeability, said magnetic circuit member including an inner portion disposed within the hollow part of said moving coil and an outer portion disposed outside said moving coil, said inner and outer portions having interconnected rear ends; and a magnet installed on said magnetic circuit member; the improvement comprising an arm member, one end of said moving coil being fixed to the fore end of said arm member, and a shaft rotatable for limited angular movement of the object about the axis of said shaft, the base of said arm member being mounted on said rotatable shaft, said moving coil being curved into a circular arc centering around said shaft and having a rectangular-shaped cross section, said magnetic circuit member also being curved into a circular arc centering around said shaft similar to the moving coil, the cross section of each of said inner and outer portions being of rectangular shape similar to that of said moving coil, the length of the moving coil along its circular arc direction being greater than the length of the magnet along the circular arc direction of the magnetic circuit member.

2. A moving-coil type motor according to claim 1, in which any one of the side walls which comprise said square cross section outer portion of the magnetic circuit member is detachable.

3. A moving-coil type motor according to claim 2, in which said one side wall is planar and has its opposite length edges curved about the axis of said shaft.

4. A moving-coil type motor according to claim 1, in which said arm member and coil form the two limbs of a substantially L-shaped configuration.

5. A moving-coil type motor according to claim 1, including a sensor unit for detecting movement of said coil about said shaft, said sensor unit including a moving part mounted on the fore end of said arm member adjacent said coil for arcuate movement therewith and a fixed part disposed near the path of movement of said fore end of said arm member.

6. A moving-coil type motor according to claim 5, in which said coil and sensor unit moving part extend in opposite circumferential directions from said arm member and therewith form a substantially T-shaped configuration.

7. A moving-coil type motor according to claim 1, in which said magnetic circuit member includes an annular coil receiving recess which curves from its closed end to its open end along a circular arc centered on said shaft, said arm member being angularly offset from said magnetic circuit member, said angular offset being variable within a preselected angular range.

8. A moving-coil type motor according to claim 1, in which said longitudinally curved magnetic circuit member and longitudinally curved coil telescope angularly about the axis of said shaft, the extent of angular overlap of said longitudinally curved magnetic circuit member with said longitudinally curved coil being variable within a preselected angular range.

* * * * *